United States Patent [19]

Blezard

[11] Patent Number: 5,004,093

[45] Date of Patent: Apr. 2, 1991

[54] STRAIGHT LINE SORTING AND/OR FILL-TO-WEIGH MACHINE

[75] Inventor: Robert C. Blezard, Harwich Port, Ma.

[73] Assignee: Charles Packaging Corporation, Lincoln, R.I.

[21] Appl. No.: 433,499

[22] Filed: Nov. 8, 1989

[51] Int. Cl.$^5$ .............................................. B65G 47/52
[52] U.S. Cl. .................................. 198/430; 198/468.2; 141/170; 141/179; 177/52
[58] Field of Search ..................... 198/345, 430, 339.1, 198/468.2; 53/473; 141/165, 168, 170, 171, 172, 178, 179, 185, 186, 83, 129, 131, 133, 134, 148; 171/52, 57, 145

[56] References Cited

U.S. PATENT DOCUMENTS

| | | |
|---|---|---|
| 1,346,613 | 7/1920 | Taliaferro et al. .............. 141/179 X |
| 2,247,401 | 7/1941 | Papendick . |
| 2,404,232 | 7/1946 | Hunter . |
| 2,967,703 | 1/1961 | Jones . |
| 3,123,956 | 3/1964 | Fisher ..................... 53/473 |
| 3,198,271 | 8/1965 | Good . |
| 3,263,759 | 8/1966 | Arvidson et al. . |
| 3,308,922 | 3/1967 | Ellis et al. ..................... 198/468.2 X |
| 3,322,167 | 5/1967 | Rosen .................... 141/131 |
| 3,462,911 | 8/1969 | Schmidt ............................. 141/170 |
| 3,693,737 | 9/1972 | Young et al. . |
| 4,010,594 | 3/1977 | Boyd .................................. 53/473 X |
| 4,339,028 | 7/1982 | Meacle . |
| 4,428,179 | 1/1984 | Jordan et al. . |
| 4,442,910 | 4/1984 | Mikami . |
| 4,548,286 | 10/1985 | Sashiki et al. . |

FOREIGN PATENT DOCUMENTS

| | | | |
|---|---|---|---|
| 2733823 | 2/1979 | Fed. Rep. of Germany ...... | 198/430 |
| 2446785 | 9/1980 | France ................................ | 198/430 |
| 0111315 | 8/1980 | Japan .................................. | 198/430 |
| 0916818 | 1/1963 | United Kingdom .................. | 177/52 |
| 2138791 | 10/1984 | United Kingdom ................ | 141/129 |

Primary Examiner—Joseph E. Valenza
Assistant Examiner—James R. Bidwell
Attorney, Agent, or Firm—Edward D. C. Bartlett

[57] ABSTRACT

A machine having multiple stationary weighing and filling platforms serviced by parallel straight line in-feed and discharge container or material conveyors. Positive grippers transfer the containers or other material to be weighed transversely to stationary weighing and filling platform and the same or similar grippers transfer the containers from the platform to a parallel discharge track. This eliminates centrifugal forces, increased throughput reduces floor space and permits greater sensitivity in weighing since there is no inherent motion or vibration at the weighing station.

32 Claims, 6 Drawing Sheets

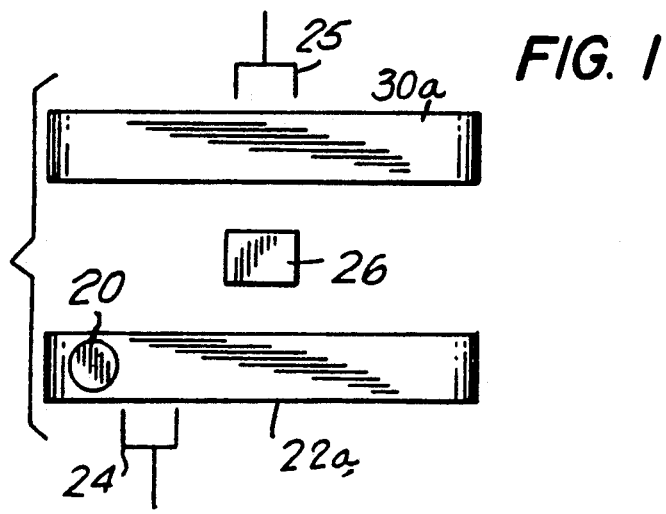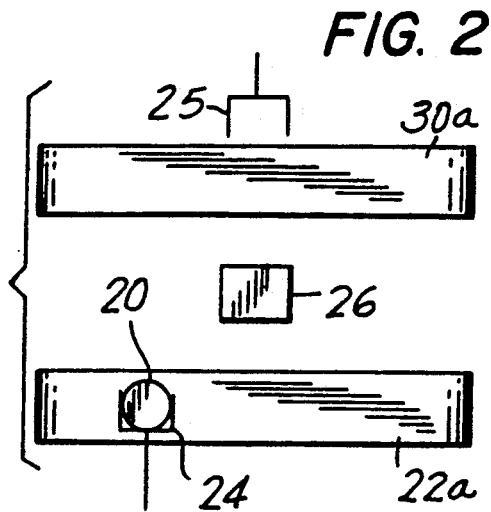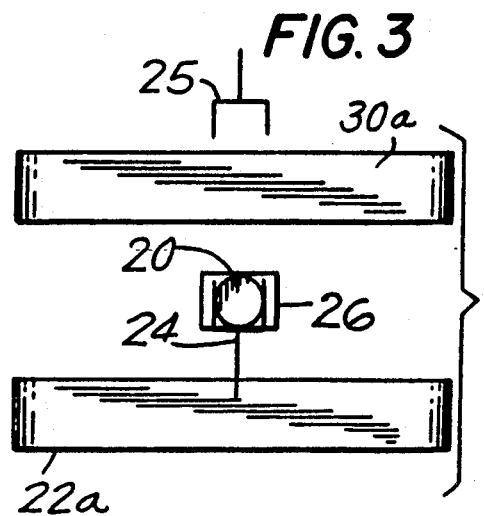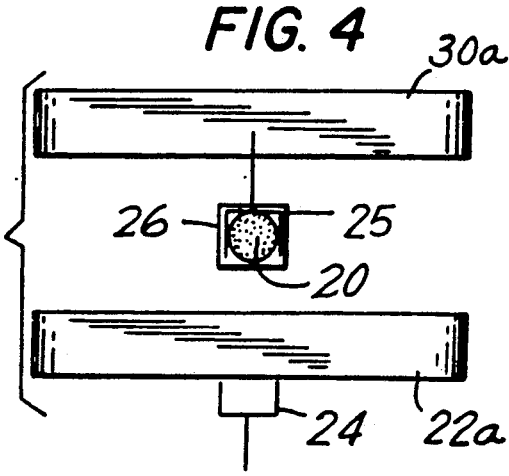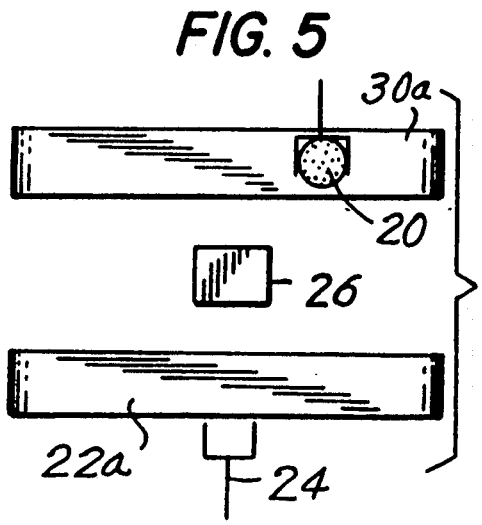

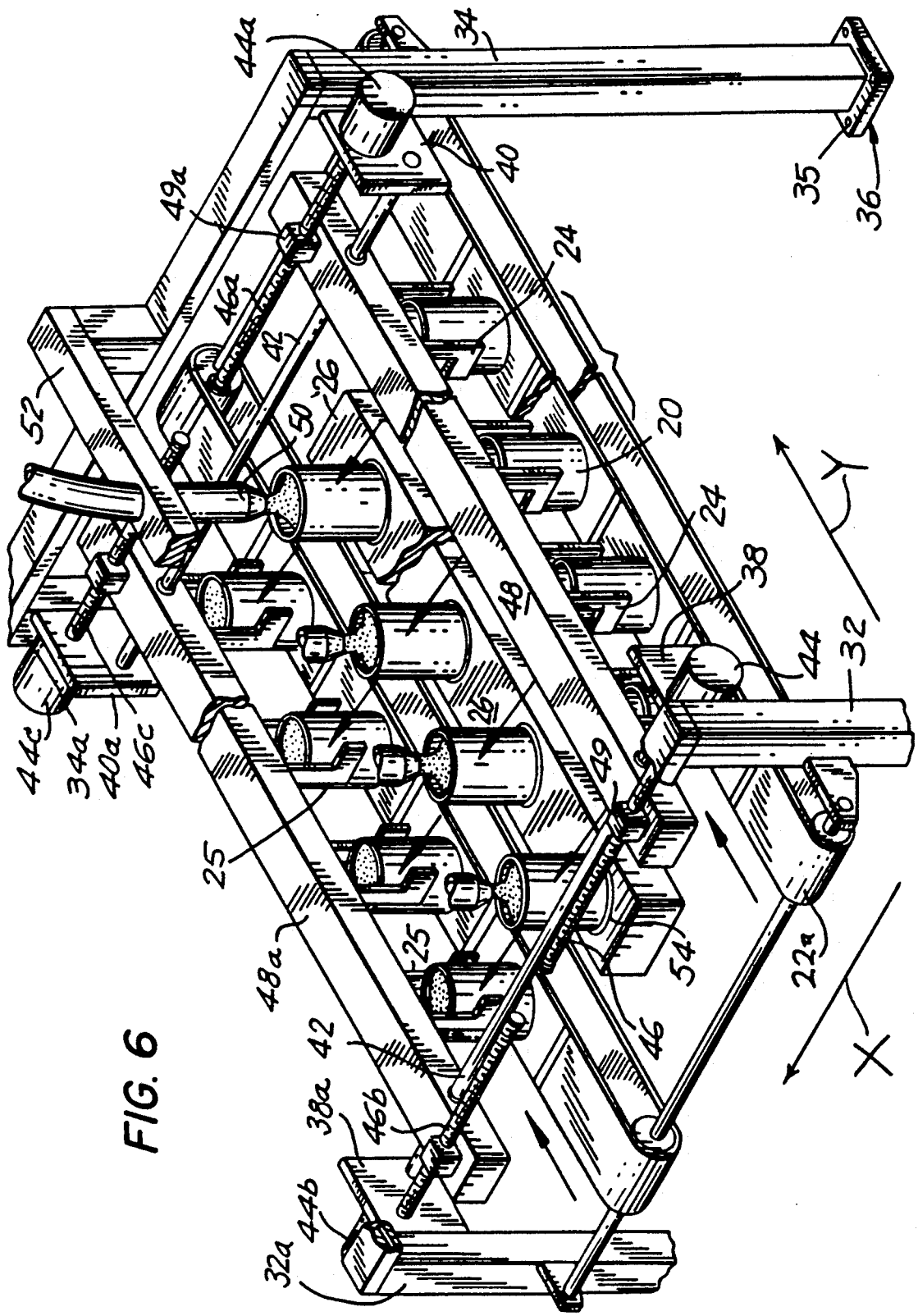

STRAIGHT LINE SORTING AND/OR FILL-TO-WEIGH MACHINE

BACKGROUND OF THE INVENTION

Heretofore, in order to maintain a relatively high speed, the containers were moved along a circular track or transferred by a pivoted arm to filling and weighing stations or positions. While high speeds have been achieved with such arrangements, filling accuracy is reduced by the vibration and movement of the containers during filling. Moreover, centrifugal forces limit the usefulness and speed of such a device, particularly where the container is fragile, such as a glass or earthenware container. Sloshing or spilling from centrifugal forces further limits the speed of such machines.

Reference is made to the following patents:

| Inventor | Patent | Dated |
|---|---|---|
| Salmonsen et al. | 4,344,493 | 8/82 |
| Patzwahl | 4,514,953 | 5/85 |
| Tisma | 4,578,929 | 4/86 |
| Schaltegger | 4,625,775 | 12/86 |
| Schaltegger | 4,657,054 | 4/87 |
| Schaltegger | 4,848,479 | 7/89 |

The patent to Shaltegger '479 is owned and subject to assignment to the same person or entity as this application. The other patents are cited in Schaltegger.

OBJECTS OF THE INVENTION

It is an object of the invention to provide an improved filling and weighing machine where containers are moved in a straight line so as to eliminate centrifugal forces. Further, it is desired that the containers be positively gripped for transfer to a weighing and filling platform that is stationary to improve the accuracy of the filling and weighing.

It is desired to feed a plurality of containers in a straight line procession parallel to a linearly arranged group of stationary filling and weighing platforms, to positively grip and transfer such containers laterally (diagonally) to the platforms and finally to a discharge conveyor travelling in a direction that will generally be parallel but may be perpendicular to the group of platforms.

An object of the invention is to completely isolate the stationary scales from the moving parts of the machine to eliminate weighing fluctuations due to inherent vibrations and other mechanical disturbances.

An object of the invention is to employ stationary filling heads so that maintenance or replacement of parts such as a feed nozzle can be performed during the operation of the machine to reduce down-time.

A further object of the invention is to reduce the actual travel speed of the containers as they approach the filling and weighing platform while maintaining a high throughput. As those skilled in the art will understand relatively slower velocity of the container reduces breakage in frangible containers and reduces spillage due to tilting or rocking of containers.

An important object of the invention is to eliminate under-filling of containers by controlling the filling from a stationary weighing device. It is an object of the invention to limit the pre-established over-fill only by the accuracy and specifications of the weighing device and filling head by eliminating errors due to vibration or movement of containers during weighing and filling and further by providing for a momentary dwell in the movement of the container at a weighing station.

A further important object of the invention is to reduce the number of moving parts. Reductions of over eighty percent of moving parts over conventional fillers have been made possible by stationary filling and weighing mechanisms served by the straight line conveyors in accordance with this invention.

The invention eliminates costly and complex epicycloidal and planetary gearing.

A further object of the invention is to provide true weight for each individual container rather than an average rate spread over a large number of containers.

Another advantage of the present design is that it is compatible with expansion for future increased capacity.

A prime object of the invention is to increase throughput at lower container velocity or conversely to reduce container velocity while maintaining high throughput. Movement along straight paths also permits actual higher container velocity than does circular or curved movement on an arc with concurrent centrifugal forces.

I have further found that my invention reduces floor space for the same throughput over the circular or rotary devices. Increased speed requires in a rotary machine an increased radius of the circular path to reduce the centrifugal forces and to accommodate a larger number of containers in the filling path. It is accordingly an object of this invention to permit higher speeds in a weighing and filling machine while at the same time conserving floor space. It is therefore an object of my invention to conserve floor space while increasing throughput and to handle containers in a more gentle fashion by eliminating harmful centrifugal forces.

It is an object of the invention to fill a container while it is held in a stationary position. This is particularly important with comminuted materials since they can be vibrated for compaction during the filling operation without increasing the risk of spillage by adding the forces of vibration to centrifugal force. Elimination of centrifugal forces are also important where the material is a liquid that will slosh and spill under the influence of centrifugal forces.

It is an object of the invention to feed parallel input conveyors which are subdivided a number of times to halve or more than halve their velocity during each division. I have found that for a container of four inch diameter such as a coffee can, a machine filling four hundred coffee cans per minute occupies less floor space and runs at substantially lowered velocities than a machine of similar capacity employing rotary or circular paths for filling.

I have further found that my machine can fill with greater accuracy since the stationary platform is inherently less susceptible to error and it is possible to fill to measure each container because of the increased accuracy. The normal variation (little sigma) is greatly reduced. Thus predetermined overfilling may be greatly reduced or entirely eliminated while complying with weight regulations.

SUMMARY OF THE INVENTION

According to one approach of the invention there is provided a conveyor to handle work pieces.

Thus, according to an aspect of the invention there is provided in a machine, an input conveyor capable of transporting work pieces in an infeed direction, a group of stations displaced from and to one side of the conveyor, and a mechanism having a longitudinal axis parallel to the infeed direction and mounted for movement transversely to the longitudinal axis between the conveyor and the stations with the longitudinal axis remaining parallel to the infeed direction. A plurality of paired gripping devices are supported along and by supporting drive means with each pair comprising an upstream gripper and a downstream gripper, the supporting drive means effecting movement of the gripping devices along the longitudinal axis relative to said mechanism.

Differential drive means can be operatively connected to one of each pair of grippers whereby the movement of a downstream gripper in the direction of the longitudinal axis is slower than the movement of the upstream gripper in that direction when said mechanism and the supporting drive means position the grippers to grip a container while being moved by the conveyor.

However, the gripping device may be electro-magnetic.

According to another aspect of the invention there is provided a method of transporting a plurality of work pieces to a plurality of work stations comprising the steps of moving and guiding the work pieces in a linear procession at a pre-determined velocity, dividing the procession at a pre-determined velocity, dividing the procession into a plurality of linear groups, slowing the divided groups to a lesser velocity than the pre-determined velocity, positively engaging and gripping each work piece of the group and transporting it to one of the work stations, sensing the work piece at each work station for selective treatment, and supporting selected work pieces of the group in procession at a given velocity and accelerating and combing the group to a selected higher velocity.

Preferably, the work pieces are gripped at the speed and in the conveyed direction they are moving at the lesser velocity, are decelerated to zero speed in that direction while they are accelerated from and then decelerated back to zero speed in a transverse direciton at right angles to the conveyed direction to bring them to rest at the work stations. This process may be reversed when transferring the work pieces from the work stations to form the procession at said given velocity.

Transport members may be vacuum cups.

Other objects, features and advantages of the present invention will become more fully apparent form the following detailed description of the preferred embodiment, the appended claims and the accompanying drawings.

BRIEF DESCRIPTION OF THE DRAWINGS

With reference to the drawings:

FIGS. 1-5 schematically illustrate the movement of a single container on the incoming track, its transfer to a filling weighing station and subsequent transfer to the discharge track;

FIG. 6 shows movement of gripper heads to and from the weighing/filling stations and input and discharge conveyors;

DETAILED DESCRIPTION OF THE PREFERRED EMBODIMENT

Figure 7:
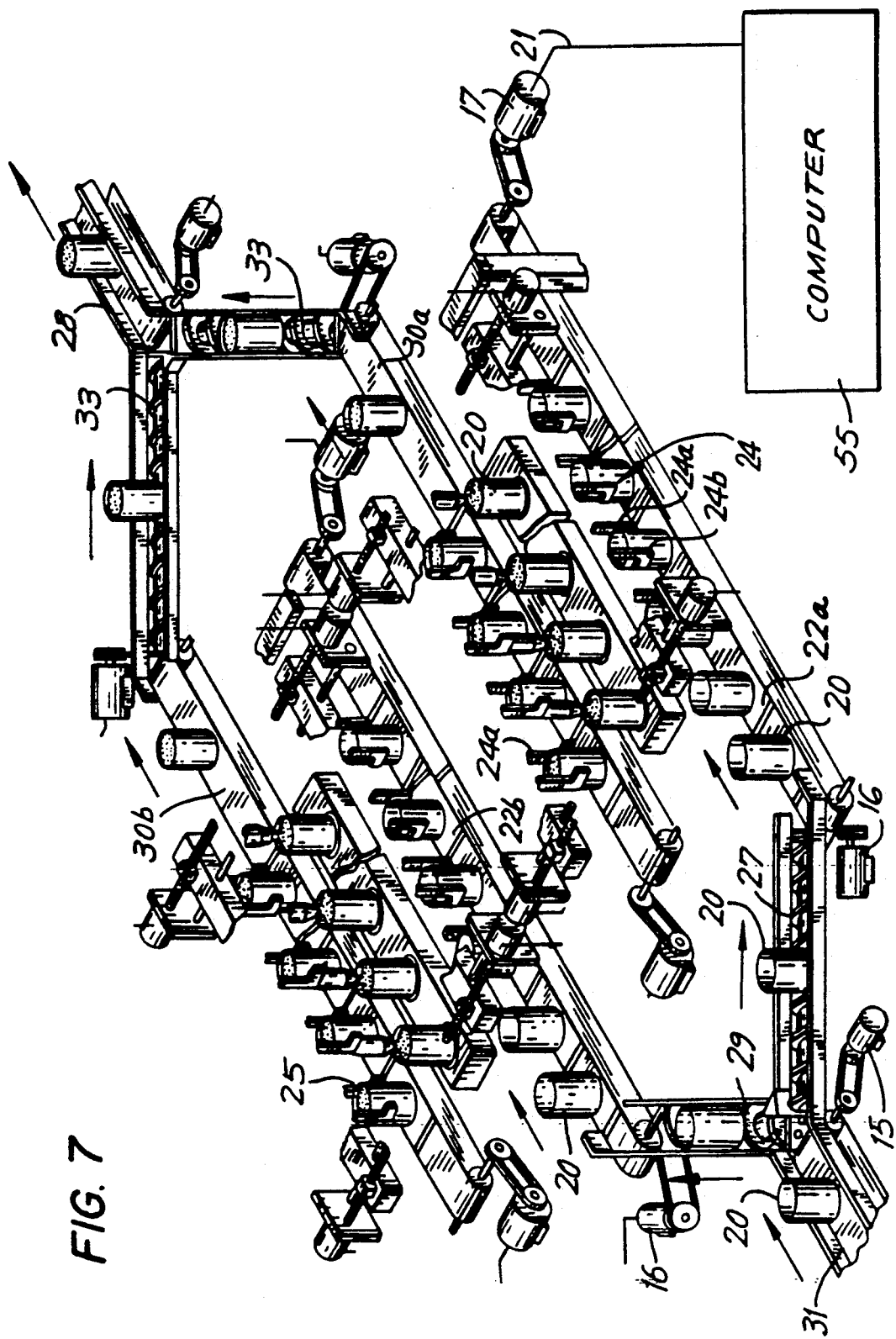
FIG. 7 shows two of a plurality of filling and weighing platforms with input and discharge conveyors and means for slowing and speeding the containers before and after filling, respectively.

Referring to FIGS. 1-5, there is shown schematically a container 20 on the final, slowest moving incoming conveyor 22a (FIG. 1). The gripper 24 removes container 20 and deposits it on the filling and weighing platform 26 (FIGS. 2 and 3). The gripper 25 removes the weighed and filled container 20 from platform 26 to discharge conveyor 30a (FIGS. 4 and 5).

Referring now to FIG. 7, there is shown a straight line feed conveyor 31 on which containers 20 are alternately separated by worm screw conveyors 27, 29 to proceed to input conveyors 22a, less) the linear speed of conveyor 31. Optionally, conveyors 22a and 22b may be intermittently driven.

Synchronous motors 15, 16 and 17 drive conveyors 31, 27 and 22a respectively. The speed of these motors may be programmed by a computer 55 connected by cables such as 21 shown to motor 17.

Discharge conveyors 30a, 30b receive containers transferred by grippers 25. Containers on discharge conveyors 30a and 30b are merged by transfer worms 33 onto discharge conveyor 28. Discharge conveyors 30a and 30b optionally may be driven intermittently.

Referring more specifically to FIG. 6, the grippers 24 positively grip the container 20, transfer it to a filling and weighing station 54 on frame or platform 26. Platform 26 is supported by posts (not shown) embedded preferably in the ground or floor of the building, to avoid vibration. That is, the weighing platform 26 is sequestered from the driving, moving and conveying parts of the machine to eliminate vibration inherent in those parts.

Posts 32, 32a 34 and 34a are mounted on the plant floor or bed 35 of machine 36. The mounting and bearing plate 38, 38a, 40 and 40a are secured to posts 32, 32a, 34 and 34a respectively. Support shafts 42 are mounted respectively in plates 38 and 40 at their one end and plates 38a and 40a at their other end. A cross-feed beam or head 48 is slidably mounted on shafts 42. Two-way synchronized electric motors 44, 44a are mounted on plates 38, 40 driving jack screws 46, 46a engaging a female thread in a bore formed in bosses 49, 49a respectively secured on head 48 to drivingly reciprocate head 48 along shaft 42. One motor 44 and associate drive may in many instances suffice but plural drives provide smoother action and eliminate any tendency to bind. Rotation of the two-way synchronized motors 44, 44a move the cross-feed head 48 carrying gripping mechanism 24 to and fro on the X-axis normal between conveyor 22 and weighing and filling platform 26. The filling nozzles 50 mounted on stationary filling head 52 are activated by micro-switches or the like (not shown) controlled by scales 54 in a manner well known in the art. The particular weighing device 54 and filling mechanism 50 may be of any suitable type.

It should be understood that the length of cross feed beam 48, the number of grippers 24 and stations 54 is a matter of choice. However, the larger the number of grippers 24 and stations 54, the slower the transfer speeds may be for a given throughput or conversely a higher throughput for the same transfer speed. The same principle applies to increasing the number of speed changes by further divisions of the input and discharge conveyors than shown. I have shown such divisions as bifurcations but a triple or higher number of divisions is within the spirit of my invention.

Still referring to FIG. 6, there is shown a cross beam 48a also slidably mounted on support shafts 42. Motors 44b and 44c are secured to plates 38a and 40a respectively. The motors 44b and 44c drive jackscrews 46b and 46c respectively, secured on head 48a to drivingly reciprocate head 48a along shafts 42.

In FIG. 7 only one subdivision of an input conveyor 31 is shown, but in a preferred arrangement a plurality of input conveyors 31 are employed. Said conveyors 31 would in turn be supplied from faster moving conveyors, each, for example, communicating with and supplying a pair of conveyors 31 and so on. An equal number of conveyors 28 receive and accelerate the discharge of filled and weighed containers to a final faster conveyor (not shown). In one embodiment of the invention I employ a 2:1 reduction between conveyors 31 and 22a, 22b and 1:2 increase from 30a (30b) to 28. That is, the relative velocity of a single conveyor 31 (28) to its communicating pair 22a, 22b, (30a, 30b) would be faster and suitably 2:1.

Figure 8:
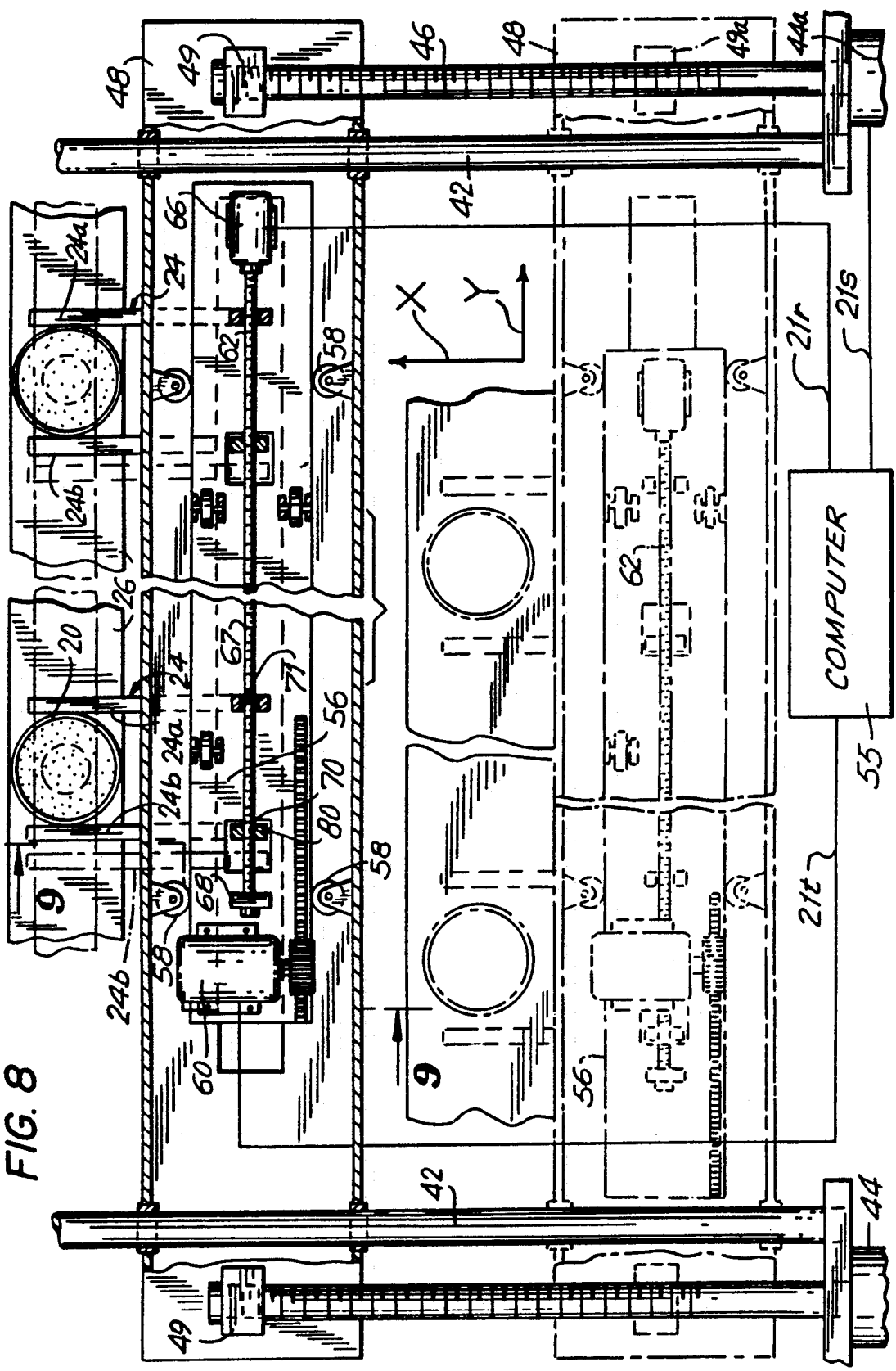
FIG. 8 shows in greater detail the mechanism for moving and operating the grippers.
Figure 9:
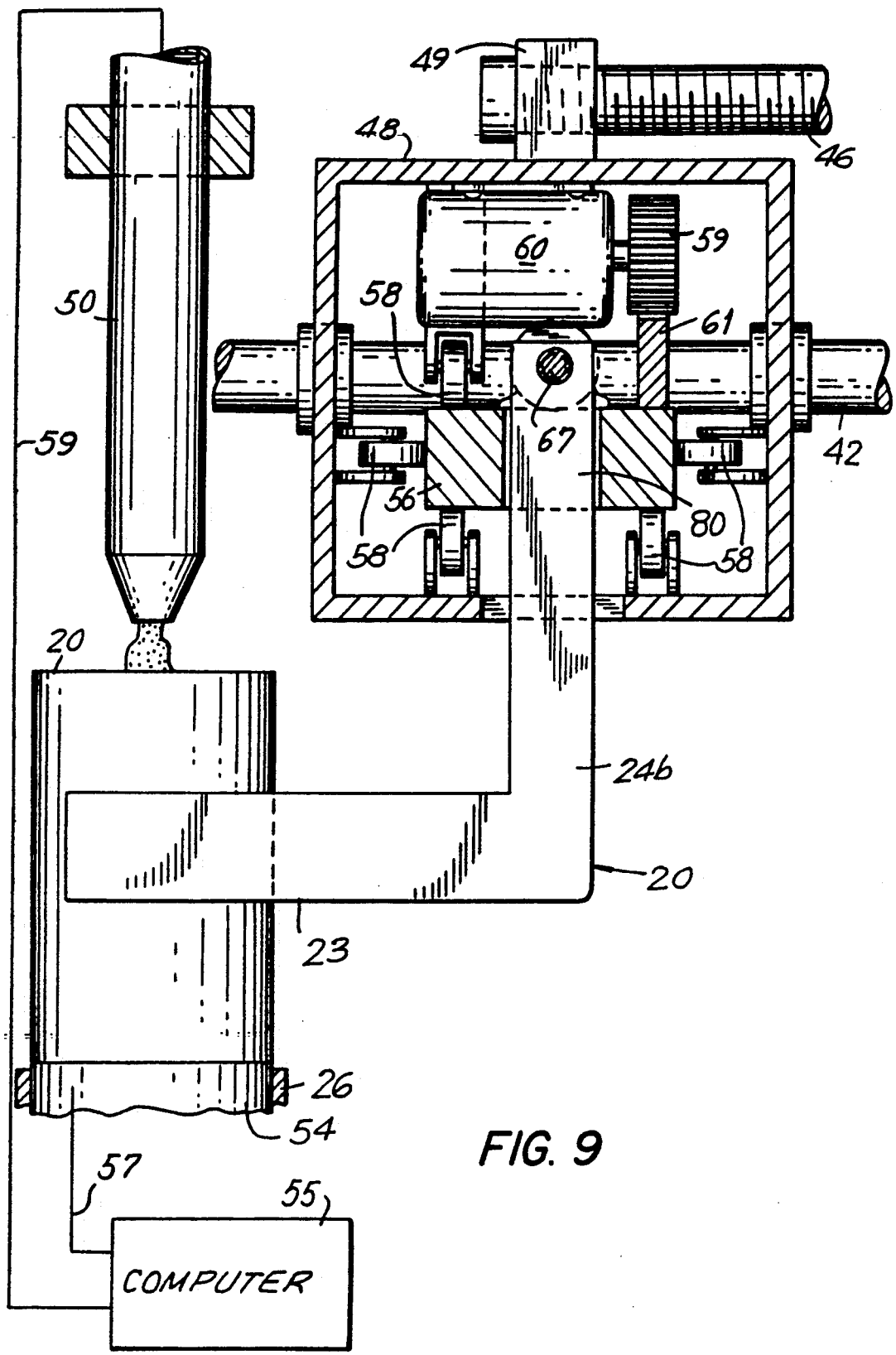
FIG. 9 is a sectional elevation taken on the line 9—9 of FIG. 8.

Referring to FIGS. 8 and 9, a more detailed illustration of beam 48 is shown. The grippers 24 have, of course, a pincer action and, in addition, they have two component gross movements; one along the X axis with beam 48 in a direction normal to the input conveyor, and the other along beam 48 on a Y axis with channel 56 in a Y direction parallel to the direction of the input and output conveyors (22a, 30a). The actual path of the grippers is the predetermined resultant of the two programmed motions or component vectors along the X and Y axes.

The beam 48 slidingly supports the channel 56 by means of the rollers 58. A synchronous two-way motor 60 mounted inside the beam 48 drives a gear 59 engaging (see FIG. 9) on channel 56 to slide channel 56 along beam 48 on rollers 58.

A synchronous motor 66 is mounted in one end of channel 56. The motor drives a jackscrew 67 revoluably supported at the other end of the channel in a bearing block 68. The pincers 24a are the leading pincers in each pair of grippers 24 with respect to the motion of the channel 56 along a conveyor 22a in the direction of movement of the conveyor. The trailing pincer 24b is movable with respect to 24a as is shown in the dash-dot line position in the upper portion of FIG. 8. The pincer 24b has a female threaded bore 70 engaging the threaded shaft 62. Pincer 24a has a non-threaded bore 71 revoluable about the threaded shaft 62. In this way, rotation of the two-way synchronous motor 66 reciprocates only the pincer 24b with respect to the pincer 24a of each pair of pincers 24.

In FIG. 8 is shown in phantom dotted lines the relative movement of the channel 56 and all of its associated parts including the grippers 24 and the container 20, also shown in phantom.

As more clearly seen in FIG. 6, the synchronous motors 44, 44a move the beam 48 back and forth on shafts 42 along the X axis. FIG. 9 shows the extension 23 of the grippers 24 so that the beam 48 will not interfere with the filler nozzle 50 shown filling a container 20 on the scale or balance 54 during the dwell in which the grippers 24 are in a slightly opened position. The scale 54 is connected to programmable computer 55 which controls the filler nozzle 50 by means of conductor wires generally indicated at 57 and 59, all in a well known manner. The rotation and timing of rotation of each of the motors 44, 44a, 66 and 60 are controlled by the computer 55 programmed to provide the desired motions. The weighing mechanisms are likewise connected to the computer 55 to coordinate timing and movement. Thus, all movements in the machine are controlled by a program that may be selectively varied to customize the machine to different containers and feed materials. This eliminates and is superior to complex-fixed cams.

Figure 10:
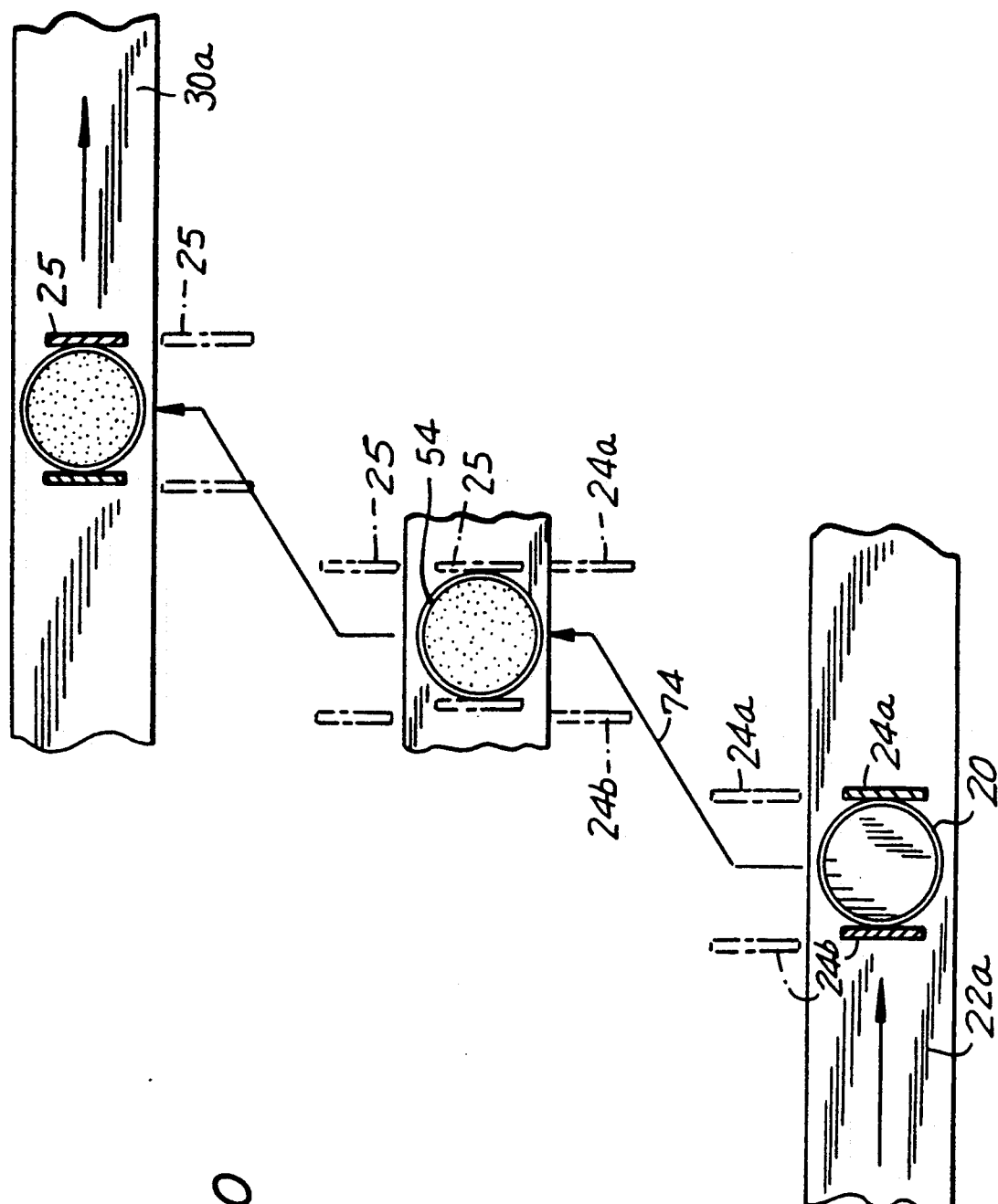
FIG. 10 schematically shows the cyclical movement of grippers transferring containers from an input conveyor to a weighing and filling station and then to a discharge conveyor.

FIG. 10 illustrates the movement or path of movement of the grippers that load and unload the weighing station. Beginning a cycle at the input conveyor 22a, the grippers 24 move in and grasp a container 20. The container 20 is one of a group (see FIG. 6), all of which are gripped and travel simultaneously by all grippers on the beam 48. The movement of a container 20 is indicated by the arrow 74 which tracks the center of container 20. The beam 48 sweeps in while the channel 56 slides with conveyor 22a. Pincer 24b closes on container 20 which is moved to station 54. It is there steadied by grippers 25 of the other beam 48a (see FIG. 6) which gently releases the container 20 a plurality of times for incremental weighing during filling. Gripper 25 then removes the container 20 and transfers it to discharge conveyor 30a. Channel 56 of the other beam 48a moves with conveyor 30a during deposition of a container 20 on conveyor 30a.

In one embodiment the grippers move at a velocity of thirty inches per second, while the subsequent incoming jar moves with the conveyor 22a at fifteen inches per second. It can be seen that this permits clearance for the next group of containers on conveyor 22a.

All these movements are programmed into the computer which controls the motors 44, 44a, 60 and 66.

Additionally, while my invention has been illustrated for filling containers with comminuted or fluid materials. It should be understood that it can be used for sorting by weight irregular objects and rejecting objects not meeting weight requirements. In such a case, the grippers could be activated to release non-conforming objects either on a different output conveyor or into a reject bin located adjacent the output conveyor 30a.

While mechanical gripping is shown in my preferred embodiment of the invention, it should also be understood that other gripping means such as electro-magnetic and vacuum grippers may be utilized. The programming of the grippers instead of operating a two-way motor 66, would operate a vacuum valve or a switch in the circuit of an electro-magnetic gripper.

Where it is desired to vibrate the containers during filling, the grippers can be programmed to release or partially release the container while the gripper itself and/or the platform 54 is vibrated. This is particularly useful when the material being fed into the containers is a comminuted material such as ground coffee, cocoa powder and the like. The application of vibration would be before or after weighings or during intervals in multiple weighings as is well-known in the art.

I do not wish to be limited to the precise arrangement of my preferred embodiments. For example, a bin could be remotely filled and weighed by a weight controlled material feeder and the bin then emptied into a container 20 held by the grippers or deposited and held on a vibrator, all within the spirit of my invention. Further, the stationary filling platform could be in line with the input conveyor beyond its terminus.

I claim:
1. In a machine:
an input conveyor capable of transporting containers in an infeed direction;
a group of stations displaced from and to one side of said conveyor;
a mechanism having a longitudinal axis parallel to said infeed direction and mounted for movement transversely to said axis between said conveyor and said stations with said axis remaining parallel to said infeed direction;
said mechanism supporting drive means for effecting movement along said longitudinal axis relative to said mechanism;
a plurality of paired gripping devices, said devices being supported along and by said drive means with each pair comprising an upstream gripper and a downstream gripper and;
differential drive means operatively connected to one of each pair of grippers whereby the movement of a downstream gripper in the direction of said longitudinal axis is slower than the movement of the upstream gripper in that direction when said mechanism and said drive means position said grippers to grip a container while being moved by said conveyor.

2. A machine substantially as set forth in claim 1 and further characterized in that said gripping device comprises at least one gripping member movable into and out of a gripping position, and said drive means moves said member to dwell in a non-gripping position at said station and then in a gripping position at said station whereby said container may be held and released during an operation of said station.

3. A machine substantially as set forth in claim 2 and further characterized in having vibratory means to vibrate said container during the period said member is in a gripping position at said station.

4. In the machine of claim 1 wherein each said gripping device is electromagnetic.

5. A machine, comprising:
an input conveyor capable of transporting work pieces in a substantially straight line,
a discharge conveyor displaced form said input conveyor;
a work station positioned between said conveyors;
a first gripping device movably mounted to move between said input conveyor and said work station, said first gripping device being constructed and arranged to grip a work piece on said input conveyor and to deposit this work piece at said work station, said first gripping device then returning to said input conveyor;
a second gripping device movably mounted to grip the work piece at said work station and move to said discharge conveyor to deposit that work piece thereon; and
coordinating means for coordinating sequential movement of said first and second gripping devices as follows:
(a) said first gripping device releases said work piece gripped and transported thereby at said work station and at substantially the same time said second gripping device, while gripping another said work piece, is accelerated along said discharge conveyor; and
(b) said first gripping device tracks to a dwell position between said work station and said input conveyor, and said second gripping device continues to be accelerated along said discharge conveyor until said second gripping device reaches the speed of said discharge conveyor whereupon said second gripping device releases said another work piece upon said discharge conveyor; then
(c) said first gripping device is positioned adjacent said input conveyor, and said second gripping device tracks to said work station in a non-gripping mode with respect to the work piece at said work station; then
(d) said first gripping device dwells adjacent said input conveyor, and said second gripping device grips the container at said work station; and
(e) said first gripping device is accelerated along said input conveyor to the speed of said input conveyor and thereupon grips a further said work piece thereon, and said second gripping device remains at said work station; and then
(f) said first gripping device tracks to said work station while decelerating its motion parallel to said input conveyor and at substantially the same time said second gripping device moves from the work station towards said discharge conveyor while being accelerated parallel to said discharge conveyor.

6. In a machine, a plurality of mechanism for handling work pieces, comprising:
an input conveyor for work pieces;
a discharge conveyor displaced from said input conveyor;
a stationary platform intermediate said input and discharge conveyors;
a first gripper mechanism constructed and arranged to grip a work piece on said input conveyor and more this work piece to said stationary platform;
a second gripper mechanism constructed and arranged to grip the work piece on said stationary platform and move this work piece to said discharge conveyor;
coordinating control means, operatively connected to said gripper mechanisms, for moving said gripper mechanisms in phase so that said first gripper mechanism is spaced from said stationary platform during any period in which said second gripper mechanism is at said platform and said second gripper mechanism is spaced from said platform while said first gripper mechanism is at said platform;
said first gripper mechanism initially moving each work piece, gripped thereby while on said input conveyor, in a direction and speed which is the same as said first conveyor, and thereafter depositing the gripped work piece at rest on said stationary platform before releasing that work piece; and
said second gripper mechanism being at rest when initially gripping each work piece on said stationary platform, and releasing the respective work piece to said discharge conveyor while said second gripper mechanism is moving this work piece in a direction and at a speed which are the same as those of said second conveyor at the instant of release.

7. The machine of claim 6, wherein said input and discharge conveyors are both driven continuously at the same speed.

8. The machine of claim 7, wherein said input and discharge conveyors are parallel to each other and are each spaced from said stationary platform.

9. The machine of claim 8, wherein each gripper mechanism comprises a longitudinal beam extending parallel to said parallel conveyors and movable in a direction at right angles to said parallel conveyors, each said beam having a plurality of gripper elements with means for moving these gripper elements along and relative to the respective beam in a direction parallel to said parallel conveyors.

10. A machine, including:
an input conveyor for presenting a linear procession of work pieces moving in an input direction at a predetermined speed;
a work station spaced transversely from said input conveyor;
a transfer mechanism for transferring work pieces from said linear procession to said work station;
said transfer ;mechanism comprising an elongate beam extending parallel to said input direction, at least one gripping device mounted on said beam and movable therealong relative thereto, a first drive for moving said gripping device along said beam parallel to said input direciton, a support structure supporting said beam for displacement in a transverse direction transverse to said input direction, and a second drive for displacing said beam in said transverse direction; and
coordinating means for coordinating operation of said first and second drives to enable said first drive to move said gripping device along said beam at said pre-determined speed as said gripping device grips one of said work pieces in said linear procession, then to decelerate to rest movement of said gripping device along and relative to said beam while said second drive accelerates said beam in said transverse direction followed by deceleration of said beam in said transverse direction to rest, said gripping device being at rest relative to said beam and said beam also being at rest upon arrival of said one of said work pieces at said work station.

11. The machine of claim 10, wherein there is a plurality of gripping devices spaced apart along said beam.

12. The machine of claim 11, wherein said gripping devices are supported on an elongate member which is slidingly supported by said beam, and said first drive is connected between said beam and said elongate member for moving said elongate member relative to said beam in a longitudinal direction parallel to said input direction.

13. The machine of claim 12, wherein said elongate member is slidable supported in said beam on rollers.

14. The machine of claim 10, wherein:
said gripping device comprises a pair of grippers movable relative to each other in a direction parallel to said input direction; and further comprising:
a third drive connected to at least one of said grippers for moving said at least one of said grippers relative to the other of said pair of grippers.

15. The machine of claim 10, wherein:
said support structure comprises two shafts extending parallel to each other and at right angles to said input direction;
said beam is slidably mounted on said two shafts for sliding movement in a direction at right angles to said input direction; and
said second drive comprises a driving jack screw driven by a motor.

16. The machine of claim 10, wherein:
there are two spaced apart and parallel input conveyors, each having an associated said work station and an associated said transfer mechanism, and further comprising:
a common main conveyor connected to feed both input conveyors;
means for driving said input conveyors slower than said common main conveyor; and
means, associated with said input conveyors, for effecting equal supplies of work pieces to said input conveyors from said common main conveyor while said common main conveyor is conveying a continuous procession of work pieces.

17. A machine, including:
an input conveyor for presenting a linear procession of work pieces moving in an input direction at a predetermined speed;
a stationary work station spaced transversely from said input conveyor and having a plurality of work positions spaced apart in a direction parallel to said input direction;
an elongate beam extending in a longitudinal direction parallel to said input direction;
a plurality of gripping devices spaced apart in said longitudinal direction on said beam and movable in unison therealong relative thereto;
a first drive for moving said gripping devices along said beam in said longitudinal direction;
a support structure supporting said beam for displacement in a transverse direction at right angles to said input direction while retaining said longitudinal direction parallel to said input direction;
a second drive for displacing said beam in said transverse direction;
said first and second drives combining in operation to enable said gripping devices to successively transfer groups of work pieces from said input conveyor to said work positions; and
coordinating means for coordinating operation of said first and second drives to enable said first drive to move said gripping devices along said beam at said pre-determined speed as said gripping devices simultaneously grip a plurality of said work pieces in said linear procession, then to decelerate to zero relative movement of said gripping devices along said beam while said second drive accelerates said beam in said transverse direction followed by deceleration of said beam in said transverse direction to rest, said gripping devices being at rest relative to said beam and said beam also being at rest upon arrival of said plurality of work pieces at said plurality of work positions.

18. The machine of claim 17, further comprising:
an output conveyor moving at said pre-determined speed in an output direction parallel to said input direction;
a second elongate beam extending in a second longitudinal direction parallel to said output direction;
a second plurality of gripping devices spaced apart in said second longitudinal direction on said second beam and movable therealong relative thereto;

third and fourth independent drives for respectively moving said second plurality of gripping devices along said second beam and said second beam at right angles to said output direction; and output coordinating means for coordinating operation of said third and fourth drives to cause said second plurality of gripping devices to grip work pieces at rest at said work positions and release these respective work pieces to said output conveyor when the respective work pieces are being moved by said second plurality of grippers in said output direction at said pre-determined speed.

19. The machine of claim 17, wherein said gripping devices each comprise a pair of grippers spaced apart in a direction parallel to said input and output directions, and further comprising means for displacing the grippers of each said pair relative to each other to grip and release any work piece moved thereby.

20. A machine, comprising:

an input conveyor capable of conveying work pieces in an infeed direction at an infeed speed;

an output conveyor capable of conveying the work pieces in a discharge direction;

a work station disposed between said input and discharge conveyors;

a beam support parallel to said infeed direction and movable by a first drive transversely to said infeed direction;

a work piece gripping device support by said beam and movable by a second drive along said beam parallel to said infeed direction;

said first and second drives being independent of each other;

a mode changing device for changing said gripping device between a work piece gripping mode and a work piece release mode; and a control system operatively connected to said first and second drives and to said mode changing device to effect acceleration of said gripping device along said beam by said second drive to said infeed speed before said gripping device grips one of the work pieces being conveyed by said input conveyor, said first drive then moving said beam transversely to said infeed direction till the gripped one of the work pieces arrives at and is deposited at said work station at rest with said first and second drives effectively stopped.

21. The machine of claim 20, further comprising:

a second beam which is supported parallel to said discharge direction and movable by a third drive transversely to said discharge direction;

an output gripping device supported by said second beam and movable therealong parallel to said discharge direction by a fourth drive; and said control system being operatively connected to said third and fourth drives and to operation of said output gripping device to effect gripping of said one work piece while at said work station by said output gripping device and transfer of said one work piece to said output conveyor with said output gripping device releasing said one work piece when moving with said output conveyor at the same speed thereof and in said discharge direction.

22. The machine of claim 21, wherein said first and second beams, said infeed direction and said discharge direction are all parallel.

23. The machine of claim 21, wherein said control system includes a computer.

24. The machine of claim 21, wherein said gripping devices each comprise a pair of grippers movable relative to each other, and said mode changing device includes a fifth drive.

25. A machine for handling work pieces, including:

a work station for the work pieces;

an input conveyor for conveying the work pieces in an infeed direction at a predetermined speed to adjacent said work station;

a transfer mechanism for transferring the work pieces from said input conveyor to said work station;

said transfer mechanism comprising at least one gripping device for gripping one of said work pieces being conveyed at said pre-determined speed by said input conveyor and releasing said one work piece at said work station;

means for operating said gripping device to grip and release said one work piece;

a first motor drivingly connected to said gripping device to move said gripping devices in a direction parallel to said infeed direction;

a second motor separately drivingly connected to said gripping device to independently move said gripping device in a direction transverse to said infeed direction; and means for controlling said first and second motors and said operating means to cause said gripping device to be moving in said infeed direction at said pre-determined speed when said gripping device grips said one work piece on said input conveyor, then accelerate said gripping device in said direction transverse to said infeed direction, and decelerate both said motors to bring said one work piece to rest as said gripping device releases it at said work station.

26. The machine of claim 25, wherein said first motor is drivingly connected to said gripping device through a rack and pinion.

27. The machine of claim 26, wherein said second motor is drivingly connected to said gripping device through a jack screw which extends at right angles to said rack.

28. The machine of claim 27, wherein said operating means comprises a motor drivingly connected to a jack screw which extends parallel to said rack and passes through said gripping device.

29. The machine of claim 28, wherein said gripping device and said operating means are mounted on a channel which is slidably mounted via rollers in an elongate beam extending longitudinally parallel to said infeed direction, said beam being slidably mounted on parallel shafts extending at right angles to said input direction, and said controlling means comprises a computer.

30. A method of transferring a work piece to and from a work station, comprising the steps of:

conveying a linear procession of work pieces in an input direction at a predetermined speed;

accelerating a gripping device in said input direction and gripping one of said work pieces in said linear procession with said gripping device when said gripping device reaches said pre-determined speed;

accelerating said gripping device, and the work piece gripped thereby, in a transverse direction to said input direction while simultaneously decelerating said gripping device in said input direction; and decelerating said gripping device in said transverse direction to zero velocity and simultaneously continuing to decelerate said gripping device in said input direction to zero velocity with said gripping device coming to rest at said work station; thereupon releasing said gripped work piece from said gripping device to leave this work piece at rest at said work station;

allowing this work piece to be at said work station for a period of time; thereafter gripping said work piece at said work station with a second gripping device while at rest and accelerating the so gripped work piece in both said input direction and said transverse direction; then decelerating said so gripped work piece in said transverse direction to zero velocity while continuing to accelerate said so gripped work piece in said input direction to said pre-determined speed; and then releasing said second gripping device to transfer this work piece to a discharge conveyor and conveying this work piece away at said pre-determined speed.

31. The method of claim 30, wherein:

said transverse direction is at right angles to said input direction;

a plurality of said work pieces are simultaneously gripped while in said linear procession by a plurality of gripping devices;

said plurality of work pieces are simultaneously deposited at a plurality of spaced apart positions at said work station in a line parallel to said input direction; and said plurality of work pieces are subsequently simultaneously transferred in a line from said work station to said discharge conveyor; and said work pieces exit on said discharge conveyor in a linear procession.

32. The method of claim 30, wherein said work pieces are containers.

* * * * *